United States Patent

Henson

[15] 3,638,895
[45] Feb. 1, 1972

[54] SPEED MOUNT CAMPER BRACKET

[72] Inventor: Samuel H. Henson, P.O. Box 488, 1201 W. Prospect St., Kewanee, Ill. 61443

[22] Filed: Mar. 24, 1970

[21] Appl. No.: 22,242

[52] U.S. Cl. ................................248/361 R, 296/23 MC
[51] Int. Cl. .........................................B60p 3/32, B65j 1/22
[58] Field of Search ..................248/361 R, 119 R, 299, 286; 296/23 MC, 35 A

[56]         References Cited

UNITED STATES PATENTS

| 1,084,261 | 1/1914 | Ewing | 248/299 X |
| 1,278,318 | 9/1918 | Edsall | 248/299 X |
| 3,345,024 | 10/1967 | Victor | 248/299 X |
| 3,486,785 | 12/1969 | Corson | 296/23 MC |

Primary Examiner—Chancellor E. Harris
Attorney—Hill, Sherman, Meroni, Gross & Simpson

[57]            ABSTRACT

A bracket for attaching camper bodies to stake pocket equipped truck beds, wherein the bracket includes a portion fitting into the stake pocket of the truck having an outwardly and downwardly extending plate attached at the top thereof, a bore at the outer end of said plate and a hook-receiving member projecting outwardly from said plate pivotably attached thereto through said bore, the hook-receiving member having an angled abutment surface for contacting a portion of the hook assembly and an elongated slot therethrough normal to said surface, the hook assembly including a J-bolt with an adjustable nut for enclamping an abutment washer against said abutment surface.

9 Claims, 6 Drawing Figures

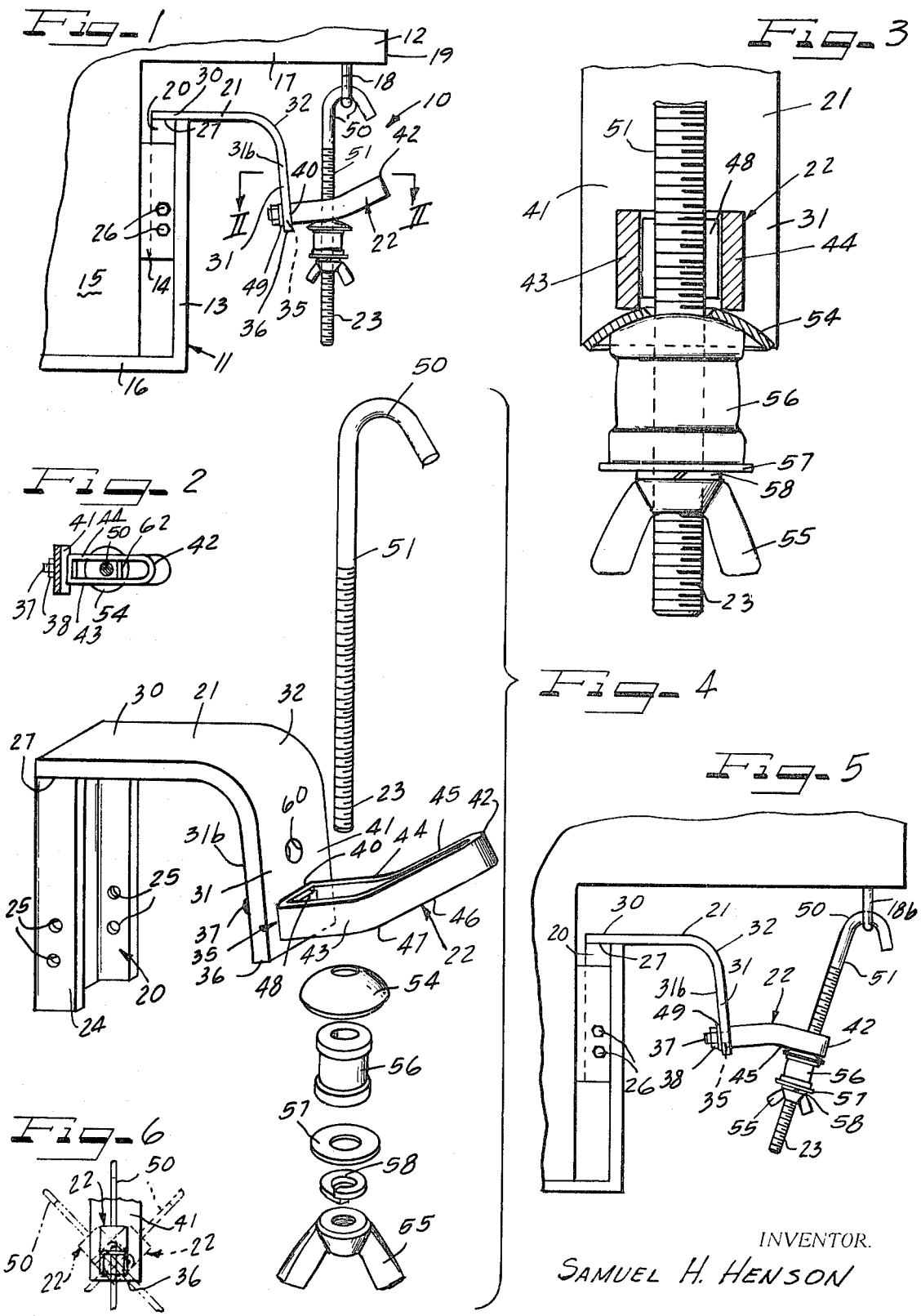

SPEED MOUNT CAMPER BRACKET

BACKGROUND OF THE INVENTION

1. Field of the Invention

This invention relates to fastening devices and more particularly to a holddown bracket for fastening camper bodies to vehicles.

2. Prior Art

Camper bodies, oftentimes providing overnight living facilities, designed to be mounted on pickup trucks or the like, are known to the art. Such camper bodies come in a wide range of designs and sizes. However, most have in common a central portion designed to rest on the truck bed with side portions extending outwardly therefrom designed to extend beyond the sides of the truck in an overhanging fashion.

Many devices have been proposed for holding these camper bodies in place on the truck body. It is common to utilize the stake pockets normally provided in the sidewalls of the truck bed to receive a portion of the holddown bracket. It has further been suggested to incorporate an outwardly and downwardly extending portion to be attached to the bracket portion which is received in the stake pocket. Most camper bodies come equipped with tiedown rings on the underside or the side of the outwardly extending overhanging portion. It has therefore been suggested to utilize turnbuckles or the like between the tiedown rings and the outwardly and downwardly extending portion of the stake-received bracket.

Due to the wide diversity of camper body sizes and styles, it has been difficult to provide a combination bracket and turnbuckle adapted to use with a majority of the available camper bodies.

It has therefore been suggested to provide a projecting plate extending from the bottom of the outwardly and downwardly extending plate, the projecting plate being pivotable thereto and having a bore therethrough for receiving the end of a turnbuckle or J-bolt. While such devices have added versatility to bracket assemblies, allowing them to be used with a wider range of camper bodies, they are limited in their application in that they limit the placement of the end of the turnbuckle or J-bolt to one or a few openings of limited size. Further, the distance between the opening in the projecting bracket and the holddown ring is limited although the provision of the projecting bracket may allow selected variations in placement of the projecting bracket opening with respect to the outwardly and downwardly extending portion.

SUMMARY OF THE INVENTION

This invention overcomes the disadvantages of prior art brackets by providing a more versatile bracket which utilizes a projecting portion extending outwardly from the bottom of the outwardly and downwardly extending portion, the projecting being configured so as to provide a wide range of attachment positions for the turnbuckle or J-bolt and accommodating a wide range of angularity between the outwardly and downwardly extending portion and the projecting holddown member such as a J-bolt or the like.

The projecting member comprises an elongated bracket member having a given thickness with a slot extending therethrough for the majority of its length. The slot is intermediate the sides of the bracket, thereby providing abutment surfaces to either side of the slot along either the top or the bottom of the bracket. The projecting portion bracket is angled along its length to loosely resemble a banana and is pivotably attached to the outwardly and downwardly extending plate.

In this manner, the bottom of a J-bolt or turnbuckle will project through the slot in the bracket and thereafter receive an abutment surface such as a trapped washer or the like which will ride against the abutment surfaces of the bracket. Due to the provision of an elongated slot, it can be seen that the holddown member can project from the bracket at any point along its length, and due to the pivotability of the projection member, the holddown member may be fastened at any angle in a plane parallel to the plane of the side of the truck while due to the provision of the slot it may be fastened at any angle in a plane normal to the plane of the side of the truck. The angular bend to the bracket coupled with its pivotability allows variations in height between the abutment surface thereof and the holddown ring of the camper.

It is therefore an object of this invention to provide a new and improved holddown unit for attaching camper bodies or the like to a vehicle.

It is another object of this invention to provide a camper body holddown unit for attaching camper bodies to vehicles having stake pockets which includes a stake pocket received portion, an outwardly and downwardly extending plate for projecting from the side of the vehicle, and an abutment outwardly extending member pivotably attached adjacent the bottom of the outwardly and downwardly extending plate, the abutment member projecting outwardly therefrom and having top and bottom parallel curved abutment faces with an elongated central slot extending substantially the length of the member centrally located therethrough.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary plan view of the holddown unit of this invention in place on a vehicle and attached to a camper body.

FIG. 2 is a cross-sectional view of the holddown unit of FIG. 1 taken along the lines II—II of FIG. 1.

FIG. 3 is a fragmentary cross-sectional view of the holddown unit of FIG. 1.

FIG. 4 is a disassembled view of the holddown unit and J-bar.

FIG. 5 is a view similar to FIG. 1, illustrating the holddown unit as attached to a wide camper body.

FIG. 6 is a fragmentary plan view of the holddown unit of this invention illustrating the pivotability thereof by broken lines.

DESCRIPTION OF THE PREFERRED EMBODIMENT

FIG. 1 illustrates the holddown unit 10 of this invention attached to a vehicle body 11 and to a vehicle carried camper body 12. The vehicle body 11 has a sidewall 13 with an interiorly disposed stake pocket 14. The camper body 12 has a central portion 15 received within the sidewalls of the truck body and resting on the bed 16 thereof. The camper body has side portions which project above and to the side of the truck body as at 17. The side portions 17 overhang the truck body extending beyond the sidewall 13. A fastening ring 18 is attached to the side portion of the camper body adjacent its outer edge 19.

The holddown unit 10 consists of a stake pocket received portion 20, an outwardly and downwardly extending plate 21, an outwardly projecting abutment plate 22, and an adjustable attachment member 23. As best illustrated in FIG. 4, the stake pocket received portion 20 consists of a U-shaped cross section member 24 having openings 25 therein. The member is dimensioned to be receivable within the standard stake pocket and the openings are preferably spaced so as to align themselves with standard openings in the stake pocket whereby an attachment member such as a bolt 26 may be passed through the stake pocket and the openings 25. One or more openings in the member 24 may have associated therewith threads so as to be boltable directly to the stake pocket. The threads may be integrally formed with the bracket material or may, for example, include standard nuts welded to the member 24. The member 24 is dimensioned so as to extend from the top of the stake pocket to a height approximately equivalent to the top of the sidewall 13 of the vehicle. It is of course to be understood that in those cases where the stake pocket is formed as an integral portion of the sidewall, that the member 24 will project into the stake pocket a sufficient distance so that its top lies in a plane approximately equal to the plane of the top of the sidewall.

The outwardly and downwardly extending plate 21 is an L-shaped member preferably made of a relatively thick rigid material such as steel. The end of one leg 30 of the member 21 is attached to the top 27 of the member 24 as by welding or the like. The member 21 extends outwardly from the sidewall 13 of the vehicle to a position beyond the vehicle. Therefore the leg 31, which is integral with the leg 30 through a bight portion 32, projects downwardly alongside of and in spaced relation to the sidewall 13.

A bore indicated at 35 is provided through the brake 31 adjacent the bottom 36 thereof. The abutment plate 22 is attached to the leg 31 by means of a bolt 37 passing through the bore 36 and secured thereto by a nut 38 or the like. The abutment plate 22 projects outwardly from the leg 31 away from the member 20.

The abutment member 22 is an elongated hollow narrow rectangular member having an attachment end 40 for abutment against the outer face 41 of the leg 31. The end 42 remote from the end 41 may be square but is preferably rounded. The sidewalls 43 and 44 are relatively thin in comparison to their depth. The sidewalls 43 and 44 are relatively thin in comparison to their depth. The sidewalls and front end 42 provide abutment surfaces 45 and 46 along their edges. The surfaces are generally parallel and the entire member 22 is bent along its length and at 47 to slightly resemble the shape of a banana. The curvature of the bend provides that when the member 22 is in the position illustrated in FIGS. 1 and 4, that the outer end 42 will lie above the end 40.

The bolt 37 which attaches the member 22 to the leg 31 may have a square or rectangular head 48 thereon which is dimensioned with respect to the space between the legs 43 and 44 such that it is entrapped therebetween preventing torsional rotation of the bolt head 48 and bolt 37. Therefore, provision of a locking washer 49 between the back side 31b of the leg 31 and the nut 38 coupled with tightening of the nut 38 will prevent torsional rotation of the member 22. However, by loosening the nut 38, the member 22 will be torsionally rotatable 360° to achieve whatever position is desirable as illustrated in FIG. 6.

The adjustable attachment member 23 is illustrated as being a J-bolt 50 having threads 51 extending substantially along the length of its long leg from the end 52 thereof. The short leg of the J-bolt 50 is received through the fastening ring 18 of the camper body with the long leg 51 thereof projecting through the slot of the abutment member 22. On the side of the abutment member 22 remote from the ring 18, a curved washer 54 is provided around the J-bolt for abutment against the abutment faces of the member 22. A wing nut 55 is utilized to tighten the attachment and to provide tension. A rubber block 56 is interposed between the washer 54 and a bottoming washer 57 and lock nut 58. The rubber block 56 acts in the manner of a compressible spring to absorb vibration while maintaining tension from the setting of the wing nut 55. It is to be understood that although a semispherical washer 54 is preferred, a standard flat washer of the like abutment member may be used.

The bend of the member 22, which is preferably arcuate but which may be angular, allows the attachment member 23 to project from the member 22 at various heights with respect to the vehicle body. For example, should the attachment member abut the abutment face 46 adjacent the end 40, the distance between the point of abutment and the top of the leg 21 would be greater than if the abutment is adjacent the end 42. This allows for vertical adjustability to compensate for vertical differences in the location of the attachment ring 18. Placement of a second opening 60 through the leg 31 at a point vertically above the opening 35 allows for a greater vertical adjustability. Further, as illustrated best in FIG. 5, torsional rotation of the member 22 to the point where the abutment face 45 is on the bottom, allows further vertical adjustability as well as providing inward and outward angularity. For example, if in FIG. 1 the attachment member 23 projected from adjacent the end 42 of the member 22, the attachment member 23 would then be angled inwardly towards the vehicle body to allow attachment to a fastening ring 18 located closer to the body. Alternatively, as illustrated in FIG. 5, with the member 22 rotated, abutment of the member 23 against the outer portions of the member 22 provides for outward angularity for attachment to the fastening ring 18b which may be located further away from the vehicle body than normal. FIG. 1 illustrates the attachment member 23 as projecting substantially parallel to the vehicle body and in this instance the member 22 may be positioned either as in FIG. 1 or as in FIG. 5. Further, a midspan support 62, as illustrated by broken lines in FIG. 2, may be utilized to provide an internal stop in the slot of the member 22 allowing the abutment member to project as in FIG. 1 without fear of its sliding toward the end 42. However, it is to be understood that the stop 62 is an alternative embodiment.

The pivotability of the member 22, as illustrated in FIG. 6, allows the attachment member 23 to project angularly in a plane parallel to the plane of the vehicle body so as to be attachable at its other end to fastening rings 18 located either above, in front of, or behind the stake pocket 14.

It can therefore be seen from the above that my invention provides for a camper body holddown bracket which is easily attachable to the stake pocket of a vehicle and which contains a pivotable outwardly projecting member having angled abutment surfaces which cooperate with an attachment member to provide flexibility of directional attachment vertically, in a plane normal to the plane of the vehicle body, and in a plane parallel to the plane of the vehicle body whereby the bracket is adaptable to a wide range of camper bodies having fastening rings located in various positions and at various distances from the vehicle stake pocket.

I claim as my invention:

1. In a camper holddown bracket having a portion receivable in the stake pocket of a vehicle and an outwardly and downwardly extending plate attached to one end of said portion, the improvement of: an outwardly projecting abutment member pivotably attached to said plate, the said abutment member projecting from the said plate away from the said stake pocket received portion, the said abutment plate comprising an elongated member having a central slot therethrough with abutment surfaces laterally on either side of the slot adjacent both open ends of the slot, the said slot extending substantially the length of the said member and being closed by an end portion of the said member at one end, the other end of said member being pivotably attached to the said plate, and an attachment member projecting through said slot having an adjustable abutment member thereon for contacting the said abutment surfaces.

2. The improvement of claim 1 wherein the said abutment surfaces of the said member are curved along the length of the said member.

3. The improvement of claim 2 wherein the said curvature is arcuate.

4. A camper holddown bracket comprising: a first member adapted to be received securely in the stake pocket of a vehicle body with one end thereof extending substantially even with the top of the vehicle body sidewall, an outwardly and downwardly substantially L-shaped plate having one end of one leg thereof attached to said one end, whereby the other leg thereof lies in spaced relation from said member, an outwardly projecting abutment member pivotably attached to said other leg of said plate projecting therefrom away from the said stake pocket received member, the said abutment member torsionally rotatable with respect to the said plate, the said abutment member being elongated having one end thereof attached to the said plate, a slot through said abutment member extending substantially the length of the said abutment member, the other end of said member closing the said slot, peripheral portions of the said abutment member forming abutment surfaces on opposite sides of the said slot extending the length of the said member, the said abutment surfaces formed on opposed sides of the said abutment member, and an adjustable attachment member projecting through said slot having an abutment member associated therewith for contacting the said abutment surfaces.

5. The bracket of claim 4 wherein the said abutment member is arcuately curved along its length and the said attachment member is easily received in the said slot movable along the length of the said slot.

6. The bracket of claim 5 wherein the said abutment member is attached to the said plate by means of a tightenable bolt received through an opening in the said plate, the said bolt effective to restrict rotation of the said member when tightened and allowing said member easy rotation when loose.

7. The bracket of claim 6 wherein a plurality of spaced openings are provided in the said plate whereby the said attachment member may be pivotably attached to the said plate at different points on the said plate.

8. The bracket of claim 7 wherein the said abutment member has at least one internal stop located in said slot restricting easy slidability of the said attachment member longitudinally in the said slot.

9. The bracket of claim 8 wherein the said attachment member comprises a threaded rod formed substantially in the shape of a "J" with threads extending partially the length of the long leg of the said "J," and the adjustable abutment member comprises a semispherical washer having an aperture therethrough received in position around the said long leg and retained thereon by means of a nut.

* * * * *